US009162589B2

(12) United States Patent
Dill et al.

(10) Patent No.: US 9,162,589 B2
(45) Date of Patent: Oct. 20, 2015

(54) LONGITUDINAL ADJUSTOR FOR A VEHICLE SEAT

(75) Inventors: Thomas Dill, Heiligenmoschel (DE); Heinrich Hammann, Teschenmoschel (DE); Viktor Enns, Kaiserslautern (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 291 days.

(21) Appl. No.: 13/876,431

(22) PCT Filed: Aug. 26, 2011

(86) PCT No.: PCT/EP2011/004304
§ 371 (c)(1),
(2), (4) Date: Jun. 24, 2013

(87) PCT Pub. No.: WO2012/052087
PCT Pub. Date: Apr. 26, 2012

(65) Prior Publication Data
US 2013/0264453 A1  Oct. 10, 2013

(30) Foreign Application Priority Data

Oct. 21, 2010 (DE) .................... 10 2010 049 542

(51) Int. Cl.
*B60N 2/08* (2006.01)
*B60N 2/07* (2006.01)

(52) U.S. Cl.
CPC .............. *B60N 2/08* (2013.01); *B60N 2/0705* (2013.01); *B60N 2/0818* (2013.01); *B60N 2/0875* (2013.01); *B60N 2/0881* (2013.01); *B60N 2/0887* (2013.01)

(58) Field of Classification Search
CPC ...... B60N 2/08; B60N 2/0705; B60N 2/0818; B60N 2/0875; B60N 2/0881; B60N 2/0887

USPC ............ 248/429, 423, 424; 397/344.1, 354.1, 397/344.13, 311
See application file for complete search history.

(56) References Cited

U.S. PATENT DOCUMENTS 5,931,436 A * 8/1999 Rohee ........................ 248/430
6,079,688 A * 6/2000 Levillain et al. ........... 248/429
(Continued)

FOREIGN PATENT DOCUMENTS

CN    1182686 A    5/1998
CN    1392846 A    1/2003
(Continued)

OTHER PUBLICATIONS

International Search Report received in connection with international application No. PCT/EP2011/004304; dtd Oct. 26, 2011.
(Continued)

*Primary Examiner* — Tan Le
(74) *Attorney, Agent, or Firm* — Foley & Lardner LLP (57) ABSTRACT

A longitudinal adjustor for a vehicle seat has a first seat rail and a second seat rail which engage around one another to form a rail profile and can be moved relative to one another in the longitudinal direction, and a rail locking member which can lock the seat rails to one another, an activation arrangement for activating an unlocking unit, a force-transmitting element which connects the activation arrangement to the unlocking unit. The force-transmitting element and interacts with the unlocking unit within the second seat rail, wherein a positively locking connection is provided between the force-transmitting element and the unlocking unit, and that the force-transmitting element serves simultaneously for mounting the activation arrangement in a pivotable fashion.

15 Claims, 6 Drawing Sheets

(56) References Cited

U.S. PATENT DOCUMENTS

| | | | |
|---|---|---|---|
| 6,231,022 B1 | 5/2001 | Becker et al. | |
| 6,843,532 B2 * | 1/2005 | Borbe et al. | 297/344.11 |
| 6,926,443 B2 * | 8/2005 | Niimi et al. | 248/429 |
| 7,222,918 B2 * | 5/2007 | Bronner et al. | 297/341 |
| 7,293,752 B2 * | 11/2007 | McCulloch et al. | 248/429 |
| 2006/0181129 A1 | 8/2006 | Bronner et al. | |

FOREIGN PATENT DOCUMENTS

| | | |
|---|---|---|
| CN | 1192917 C | 3/2005 |
| DE | 33 46 754 A1 | 7/1985 |
| DE | 195 10 618 A1 | 11/1995 |
| DE | 100 41 605 C1 | 1/2002 |
| DE | 202 08 719 U1 | 7/2003 |
| DE | 102005 39 540 A1 | 8/2006 |
| DE | 102006 21 884 B3 | 10/2007 |
| DE | 1020070 27 321 A1 | 2/2009 |
| DE | 1020070 59 371 A1 | 6/2009 |
| DE | 1020080 58 518 A1 | 5/2010 |
| EP | 0 752 338 A1 | 1/1997 |
| EP | 0 805 065 A2 | 11/1997 |
| EP | 0 842 808 A1 | 5/1998 |
| EP | 0 962 356 B1 | 12/1999 |
| JP | 10-181398 | 7/1998 |

OTHER PUBLICATIONS

Office Action dated Nov. 24, 2014 in corresponding Chinese Application No. 201180040486.6, 5 pages.

Office Action dated Mar. 25, 2014 received in corresponding Japanese Application No. 2013-528539.

International Preliminary Report on Patentability (IPRP) and Written Opinion in PCT/EP2011/004304 dated Apr. 23, 2013.

* cited by examiner

LONGITUDINAL ADJUSTOR FOR A VEHICLE SEAT

CROSS REFERENCE TO RELATED APPLICATIONS

The present application is a National Stage of International Application No. PCT/EP2011/004304 filed on Aug. 26, 2011, which claims the benefit of German Patent Application No. 10 2010 049 542.5 filed on Oct. 21, 2010, the entire disclosures of which are incorporated herein by reference.

The invention relates to a longitudinal adjustor for a vehicle seat, in particular for a motor vehicle seat.

A longitudinal adjustor of this type is known from DE 10 2006 021 884 B3. In this case a first seat rail connected to the vehicle structure and a second seat rail connected to the seat structure are provided and engage around one another and are movable relative to one another in the longitudinal direction. A rail locking means, which is arranged largely within the rail profile, and an unlocking flap, which is arranged outside the rail profile and acts on the rail locking means upon activation, are further provided. The unlocking flap is pivotably mounted on the second seat rail by means of a holder.

An activation arrangement for a rail locking means is further known from DE 10 2008 058 518 A1 and has a lever that is rotatably or pivotably mounted on a seat rail, wherein the lever is connected in a positive or integral manner outside the seat rails to the unlocking means of the seat rails. For the pivotable arrangement, the lever can be inserted into an opening in the seat rail from the outside, at a distance from the unlocking means. The lever cooperates with a clip, which is likewise arranged outside the seat rails and which is in turn connected to the unlocking means. The unlocking means has a protrusion which protrudes outwardly through a slit and which is clamped in the clip.

A longitudinal adjustor for a vehicle seat comprising two first seat rails to be connected to the vehicle structure and two second seat rails to be connected to the vehicle seat is known from DE 195 10 618 A1, wherein a first and a second seat rail engage around one another so as to form a rail profile and are movable relative to one another in the longitudinal direction. A rail locking means that locks the seat rails to one another is provided, wherein the rail locking means is arranged at least for the most part within the rail profile formed by the seat rails. Furthermore, an unlocking unit and an activation arrangement for activating the unlocking unit are provided, wherein the unlocking unit (not illustrated in greater detail) is arranged for the most part within the rail profile formed by the seat rails, and only a lever arm protruding laterally from the second seat rails is illustrated. A force-transmitting element is further provided, which connects the activation arrangement to the unlocking unit. In this case the force-transmitting element is formed by a crossbar and two rocker levers connected fixedly to the crossbar. The crossbar is mounted laterally in the second seat rails in mounting points, wherein single bores are provided in the second seat rails for this purpose, in which the ends of the crossbars are mounted. The rocker levers are arranged slightly distanced outside the second seat rails and cooperate by one end with the corresponding lever arm of the unlocking unit protruding from the rail profile. One of the two rocker levers is long and, together with the end distanced from the lever arm, forms the hand lever of the activation arrangement.

A longitudinal adjustor in which an overload safeguard is provided between the force-transmitting element and the activation arrangement and protects against overload in a direction against the normal direction of activation for unlocking is further known from DE 202 08 719 U1. In accordance with a variant of this overload safeguard, said overload safeguard is provided such that the activation lever bends in the event of overload. In another variant, the activation lever is mounted eccentric to the shaft and rests against an eccentric part of the shaft, biased by a spring. If the torque effected by the force acting on the activation lever against the normal direction of activation for unlocking exceeds the torque of the counteracting resilience, the activation lever thus becomes disengaged from the shaft.

The object of the invention is to improve a longitudinal adjustor of the type mentioned in the introduction. This object is achieved in accordance with the invention as described further herein. Advantageous embodiments are disclosed.

Since the force-transmitting element extends into the second seat rail or through the second seat rail and, at the same time, is used for the pivotable mounting of the activation arrangement, the unlocking means for the seat rails can be displaced fully into the rail profile, where the entire arrangement is protected. In addition, the spatial requirement for the activation process is minimized.

The force-transmitting element is preferably formed at least in part by a shaft, which has an activation pivot axis extending perpendicular to the longitudinal direction of the seat rails, wherein the force-transmitting element extends at least until within the second seat rail, in particular transversely through the second seat rail. If the force-transmitting element extends through the second seat rail transversely, lateral openings in the seat rail can thus be used as mounting points. Bearings may particularly preferably be arranged in the openings so as to reduce friction. At least one of the bearings can additionally be used to define the axial displaceability of the force-transmitting element.

The unlocking unit preferably has at least one lever arm, which is arranged completely within the second seat rail and is connected to the force-transmitting element. The lever arm is particularly preferably pivotable by the force-transmitting element about an activation pivot axis running concentrically with the force-transmitting element, wherefore the lever arm sits on the force-transmitting element, particularly preferably with a positive fit. For example, the positive fit may be produced by a spline, in particular by a star-shaped spline, although any other splines are also possible, particularly square, hexagonal or circular splines with a region cut off in a chord-like manner. If a profile that is not point-symmetrical is used, the alignment of the force-transmitting element with the lever arms can thus be defined easily.

The rail locking means preferably has a guide part, which is attached to the second seat rail and has guide sleeves for guide fingers. The guide fingers are used to guide locking plates. In this case the length of the guide fingers may be dimensioned such that they also end in their corresponding end position (locked position) within the second seat rail, such that the number of openings to be provided in the second seat rail can be reduced.

Locking springs are particularly preferably provided on the guide part and draw the locking plates into the locked position. These locking springs can be integrally cast directly in the guide part, but can also be connected thereto in any other manner.

For reasons of symmetry, two lever arms sitting on the force-transmitting element are preferably provided. These are particularly preferably interconnected at one end via a stirrup region. This stirrup region can be used as a starting point for a spring, which for example protects the force-transmitting element against rotation in an undesired direction in the event of maloperation.

The invention is explained in greater detail hereinafter on the basis of an exemplary embodiment illustrated in the drawing, in which.

A longitudinal adjustor 1 of a vehicle seat 3 in a motor vehicle is used for (manual) longitudinal adjustment, that is to say for adjustment of the longitudinal position, of the vehicle seat 3. The longitudinal adjustor 1 is provided on each side of a vehicle seat with a pair of seat rails, consisting of a first seat rail 5 to be connected to the vehicle structure and a second seat rail 8 to be connected to the vehicle seat. The two seat rails 5 and 8 engage around one another to form a rail profile and are movable relative to one another in the longitudinal direction, wherein balls (not illustrated) are arranged between the two seat rails 5 and 8 to reduce friction. In the arrangement of the exemplary embodiment, the second seat rail 8 protrudes upwardly (vertically) beyond the first seat rail 5, which, together with the longitudinal direction, defines the directions used, although a lateral (horizontal) protrusion is also possible in principle.

The two seat rails 5 and 8 can be locked to one another by means of a rail locking means 10 arranged for the most part within the rail profile, the principle of this being described in DE 100 41 605 C1, of which the disclosure is expressly incorporated herein. This rail locking means 10 is releasable via an activation arrangement 11 arranged outside the seat rails and has a hand grip or stirrup for lifting, which protrudes in a forward direction at the front end of the vehicle seat 3.

The rail locking means 10 has at least one locking plate 12, which is mounted movably on the second seat rail 8 by means of a guide finger 14 and is biased against said guide finger by means of a locking spring 16. Teeth 18 projecting from the locking plate 12 engage, through slitted openings 20 in the second seat rail 8, in detents 21 in the first seat rail 5. The guide finger 14 protrudes in the present case from the rail profile and protrudes slightly beyond the second seat rail 8.

The guide finger 14 is guided in a sleeve-like extension of a guide part 24, which is injection molded from plastic. The locking spring 16 is further injected integrally in this guide part 24 at one end, whereas the other end is connected to the locking plate 12.

For a practically continuous locking process and to increase the longitudinal locking strength, the rail locking means 10 has three locking plates 12 arranged in succession in the longitudinal direction in the present case. All guide fingers 14 assigned to the three locking plates 12 are guided in the present case in a single guide part 24 with three sleeve-like extensions. It is also possible, however, for a different number of locking plates to be provided, for example just a single locking plate per rail locking means. Each locking plate may also be connected to its own guide part. The number of guide fingers and/or locking springs per locking plate may also be greater.

Figure 1:
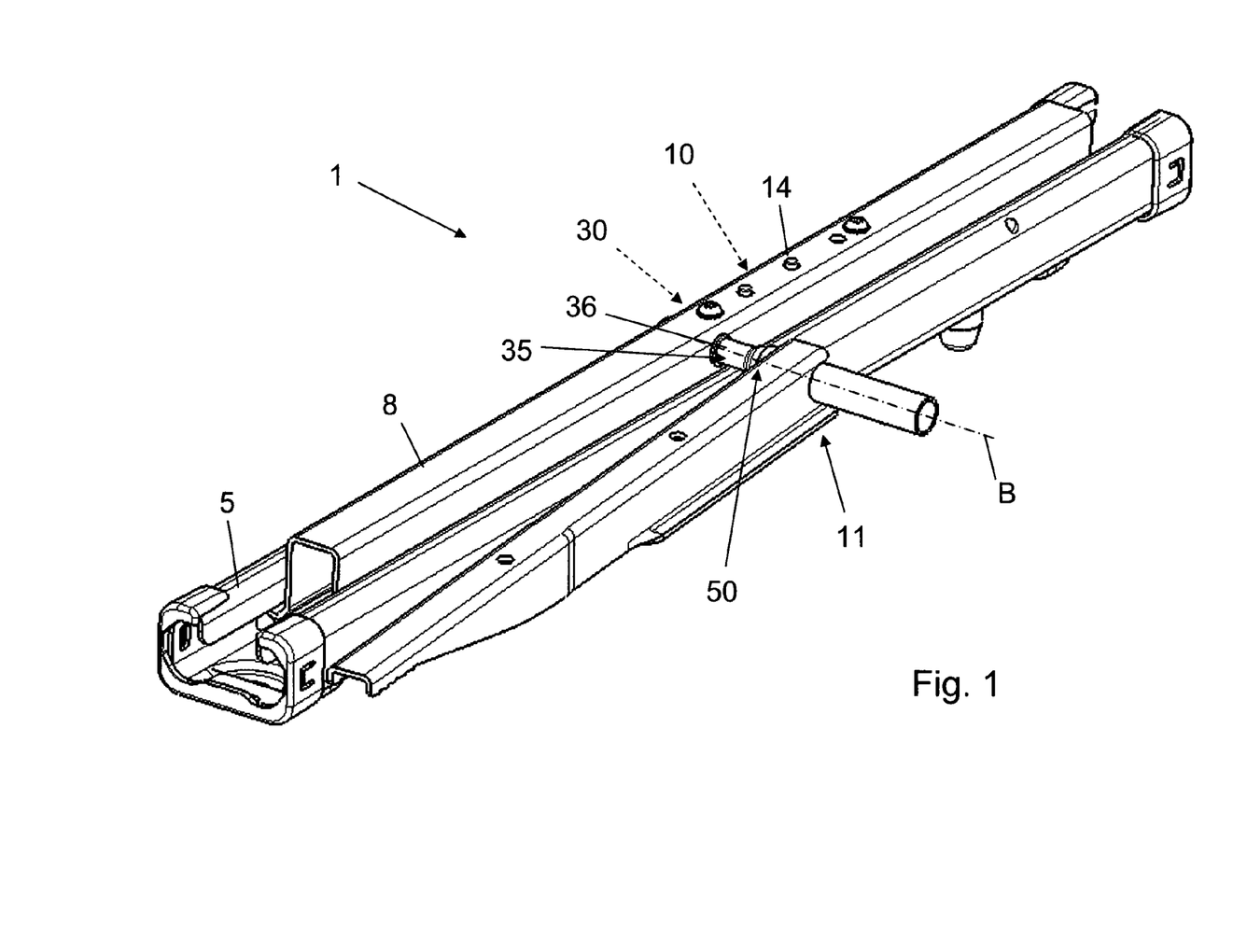
FIG. 1 shows a perspective view of the exemplary embodiment in the locked position.
Figures 2, 3:
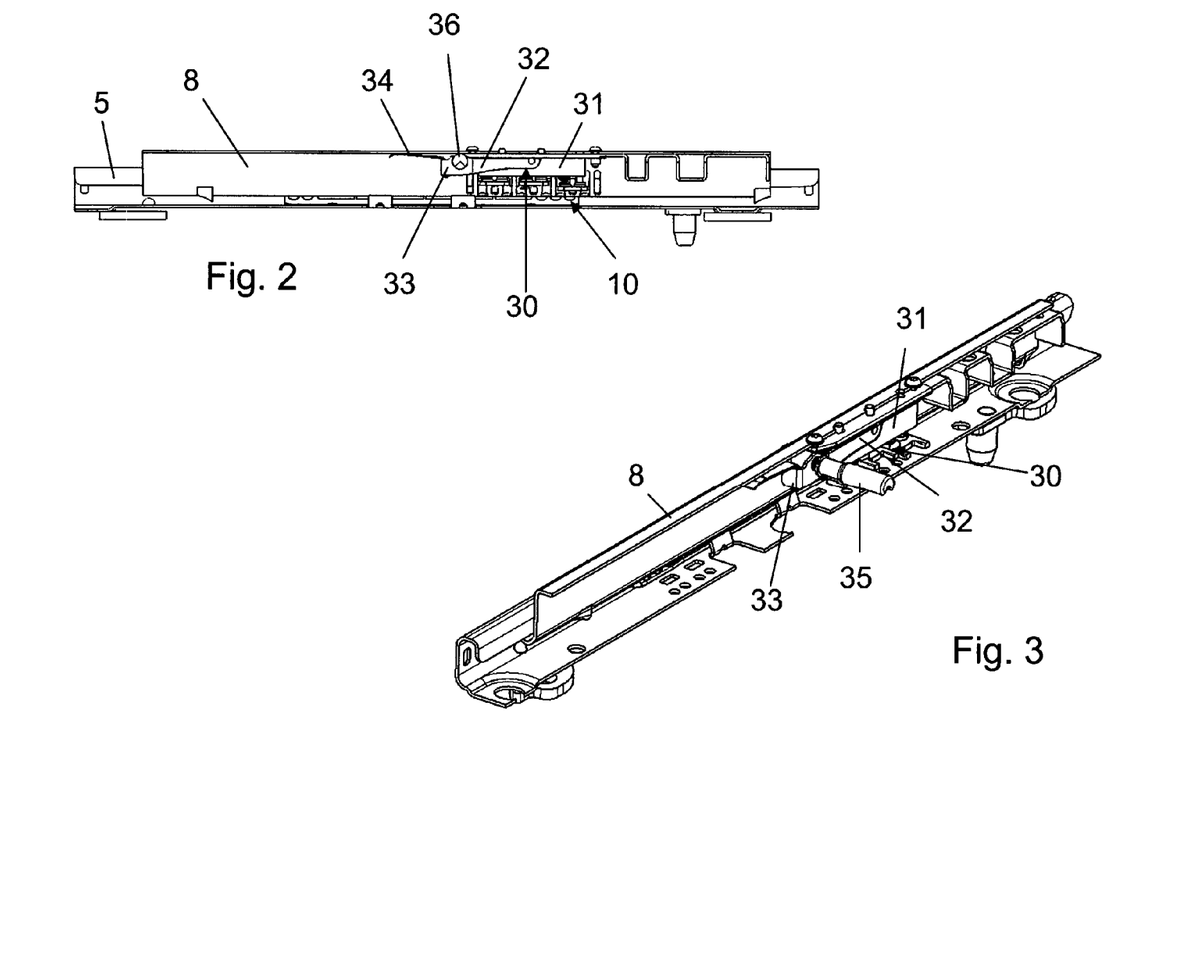
FIG. 2 shows an open side view of FIG. 1.
FIG. 3 shows a perspective exposed view of FIG. 1.
Figure 4:
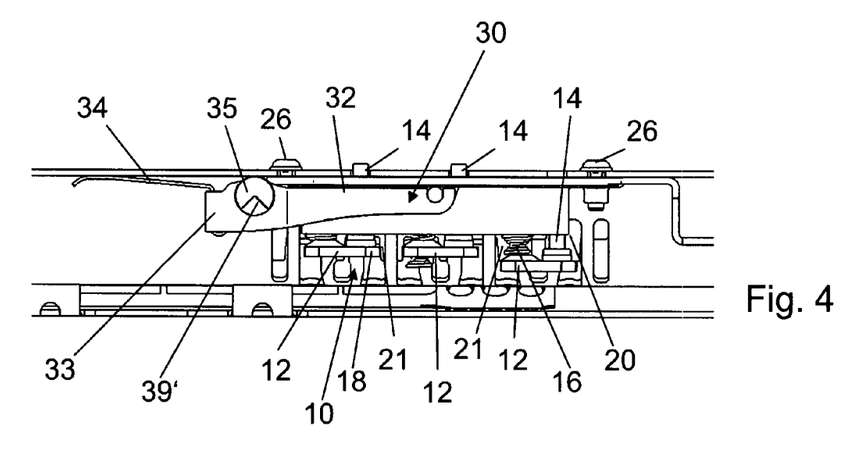
FIG. 4 shows an open side view of the locking region in the locked state.
Figure 5:
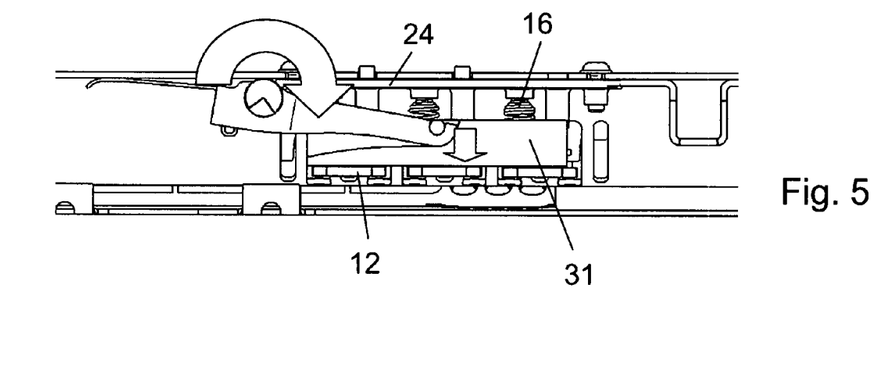
FIG. 5 shows a view corresponding to FIG. 4 in the unlocked state.
Figures 6, 7, 14:
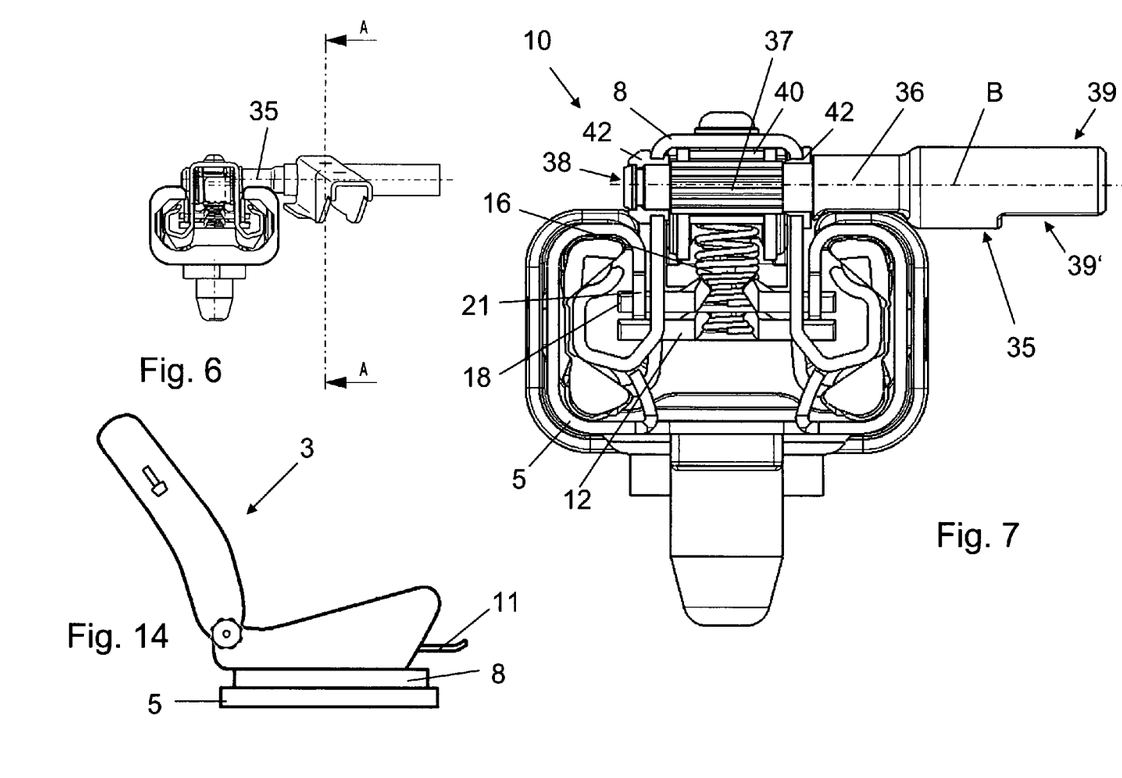
FIG. 6 shows a view of the exemplary embodiment in the longitudinal direction of the seat rails.
FIG. 7 shows a cross section through the connection region.
FIG. 14 shows a schematic side view of a vehicle seat.
Figure 8:
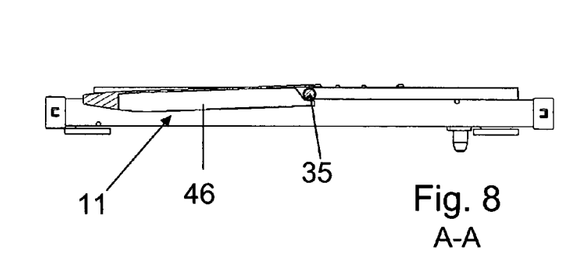
FIG. 8 shows a side view cut along line A-A in FIG. 6 in the locked position.

The common guide part 24 for the three locking plates 12 is held in the profile of the second seat rail 8 by means of two screws 26 screwed in from above, as can be seen in FIG. 3, wherein the guide fingers 14 protrude through the guide part 24 and protrude outwardly through corresponding openings in the second seat rail 8.

As a result of the provision of a corresponding guide part with sleeve-like extensions, a shorter guide finger length may also be formed however, in which case the guide fingers do not protrude through openings in the second seat rail 8, that is to say the guide fingers move within the sleeve-like extensions.

The rail locking means 10 is surrounded in part by an unlocking unit 30, which, in the present case, is arranged completely within the second seat rail 8. The unlocking unit 30 has two side plates 31, which extend above the teeth 18 of the locking plates 12 in the longitudinal direction of the seat rails 5, 8. In the locked state, the two side plates 31 rest against the underside of the guide part 24 and are distanced at least slightly from the locking plates 12, but may also possibly rest loosely thereagainst. These side plates 31 consist of plastic in the present case, but may also consist of another suitable material, such as metal.

The unlocking unit 30 further has two lever arms 32 pivotably connected to the side plates 31 at laterally outwardly protruding pins and pivotable about an activation pivot axis B arranged perpendicular to the longitudinal direction of the seat rails 5, 8, the side plates 31 being movable to and fro by means of said lever arms. The two lever arms 32 are interconnected rigidly in the present case by a stirrup region 33 on the side distanced from the side plates 31, but may also be formed separately.

The lever arms 32 consist in the present case of a punched and formed sheet steel. With sufficient strength, in particular with corresponding inserts and/or reinforcements in particularly stressed regions, the lever arms may also consist of plastic for example. Of course, other materials having suitable strength properties are also possible.

A return spring 34, in the present case formed by a leaf spring, is arranged in the stirrup region 33 between the two lever arms 32 and is supported against the inner face of the second seat rail 8.

Alternatively to a leaf spring, another suitable spring may also be provided, which is preferably supported against the second seat rail so as to exert a restoring force onto the lever arms 32. The spring does not necessarily have to engage the stirrup region 33, but for example may also cooperate directly with the lever arms 32, in particular if these are formed separately.

The two lever arms 32 of the unlocking unit 30 are connected via a force-transmitting element 35 to said activation arrangement 11 in a positive, non-positive and/or integral manner, but in particular preferably purely in a positive manner. In the present case, a shaft 36 acts as a force-transmitting element 35, wherein the force is transmitted with a positive fit by means of a star-shaped spline 37 formed on the shaft 36. Alternatively to a star-shaped spline 37, any other solid or hollow profiles are also conceivable, of which the cross section differs from the circular shape and which enable force transmission with minimal play. The spline 37 extends over a length that is slightly greater than the distance between the sides of the two lever arms 32 facing away from one another. A sleeve 40, which is used as a spacer for the two lever arms 32, sits on the shaft 36 with slight play in the present case. The sleeve may also be pressed onto the shaft or may sit loosely on the shaft with considerable play.

The shaft 36 is mounted in lateral openings in the second seat rail 8 with bearings 42 arranged between, said bearings being positioned on either side of the spline 37, wherein the corresponding region of the second seat rail 8 protrudes from the first seat rail 5. The shaft 36 is stepped a number of times, wherein the first end region 38 protruding beyond the second seat rail 8 is chamfered at the end face and is formed with an annular groove at a slight distance therefrom. The first bearing 42, which is arranged on this side, has a corresponding circumferential rib on its inner lateral surface, said rib being positioned in the annular groove when assembled and thus securing the shaft 36 in the first bearing 42. The first bearing 42 in turn in its outer lateral surface has a circumferential annular groove, in which the side wall of the second seat rail 8 is positioned. This arrangement holds the shaft 36 in the second seat rail 8. Said spline 37 is arranged adjacent to the mounted region, wherein a corresponding root diameter of the spline 37 corresponds in the present case approximately to the outer diameter on which the first bearing 42 sits. The spline 37 itself is positioned in correspondingly profiled openings in the lever arms 32. The sleeve 40 sits on said spline. The second bearing is arranged adjacent to the spline 37 in a region having an outer diameter that in the present case is slightly smaller than the outer diameter of the spline 37. The second bearing 42 is supported against a further step.

The shaft 36 ends at the second end region 39 in a cylindrical region having a V-shaped groove 39' extending in the longitudinal direction of the shaft 36, said V-shaped groove having a 90° angle in the present case. This second end region 39 of the shaft 36 is also referred to hereinafter as the activation end. On the whole, the shaft 36 is thus formed in a bit-like manner. For assembly of the bearings 42, said bearings are widened slightly resiliently and slid over the shaft 36. In this case the bearings 42 may also be formed in a slitted manner.

The angle of the V-shaped groove 39' may also differ from a right angle. Furthermore, curved walls are also conceivable.

A transmission pipe 44, which is rigidly connected to an activation lever 46, for example welded thereto, sits on the activation end of the shaft 36. A misuse overload protection spring 48 in the form of a leaf spring is also provided and is connected rigidly to the activation lever 46.

In its rail-side end, the transmission pipe 44 has a ¾ circular region, which is formed by making a longitudinal cut in the pipe and by bending the shortened tab 44' thus formed by 90° in the present case. As can be seen from FIG. 9, the tab 44' rests against the walls of the groove 39' in the normal state, namely on the side of the groove 39' arranged in the direction of movement of the activation lever 46.

Alternatively, other angles of bend of the tab 44' are also possible.

The end region of the misuse overload protection spring 48 is bent on the side of the transmission pipe in such a way that it rests in a biased manner against the tab 44' and the opposite wall of the groove 39', in the present case in a planar manner, both in a normal arrangement of the activation lever 46 in the locked state of the rail locking means 10 and in the unlocked state thereof. This arrangement forms an overload safeguard 50, the function of which will be explained in greater detail further below.

The entire arrangement is assembled by positioning, in a first step, the unlocking unit 30 including the rail locking means 10 in the second seat rail 8 and by fastening said unit by means of the screws 26 from above by screwing the screws 26 into the guide part 24. The first bearing 42 may be inserted beforehand or directly after into the corresponding opening in the second seat rail 8, whereas the second bearing 42 is slid directly onto the force-transmitting element 35 before assembly on the second seat rail 8. The first end region 38 of the force-transmitting element 35 is then slid laterally through the opening in the second seat rail 8 assigned to the second bearing 42, and through the two lever arms 32 including sleeve 40, wherein, when the spline 37 reaches the corresponding opening in the first lever arm 32, it is aligned in a defined manner in relation to the lever arms 32. The insertion ends as soon as the rib, running over the inner circumference, of the first bearing 42 snaps into the annular groove adjacent to the first end region 38 and thus fixes the arrangement rotatably. The transmission pipe 44 of the activation arrangement 11 is then slid onto the second end region 39 in a suitable alignment, wherein the bent end region of the misuse overload protection spring 48 dips into the groove 39'.

The second seat rail 8 is then introduced into the first seat rail 5, together with the rail locking means 10 and unlocking unit 30.

The entire arrangement functions as follows:

In the locked starting position, the rail locking means is activated, that is to say the teeth 18 of at least one of the locking plates 12 grip in detents 21 in the first seat rail 5.

Figure 9:
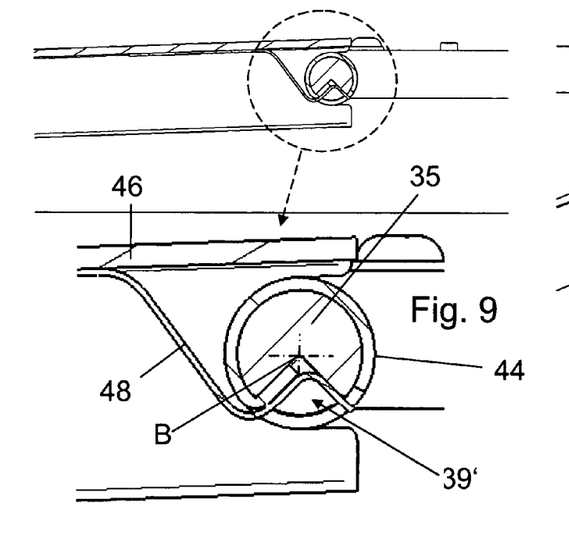
FIG. 9 shows a detailed view with an additional enlarged detail from FIG. 8.
Figure 10:
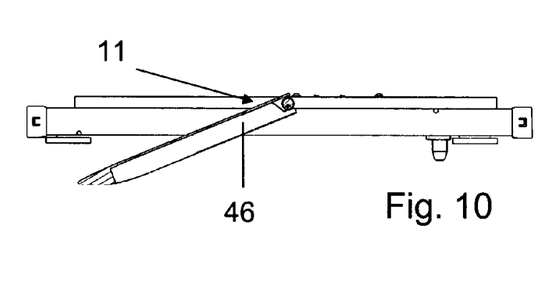
FIG. 10 shows a side view cut along line A-A in FIG. 6 in a position of maloperation.
Figure 11:
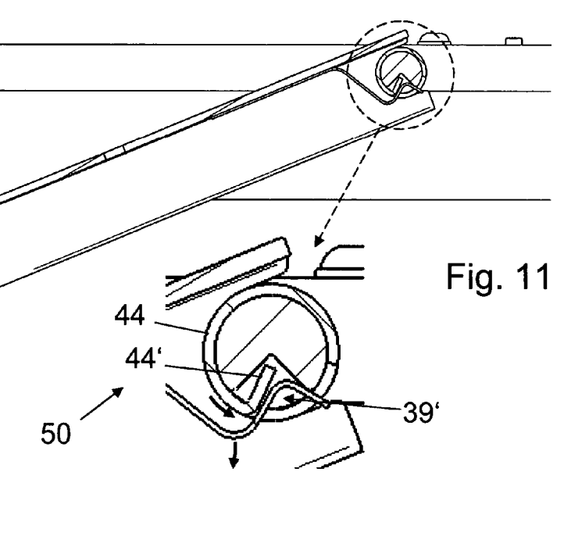
FIG. 11 shows a detailed view with an additional enlarged detail from FIG. 10.
Figure 12:
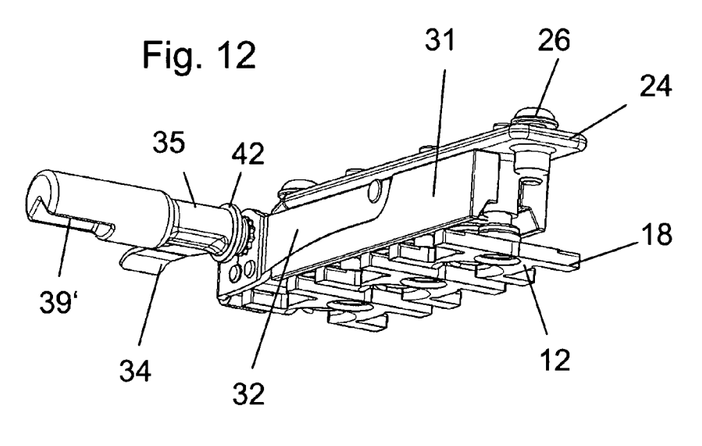
FIG. 12 shows a perspective view of the locking unit including the unlocking block.
Figure 13:
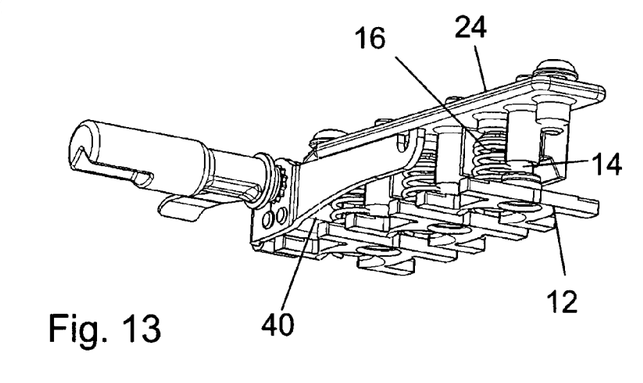
FIG. 13 shows a perspective view corresponding to FIG. 12 without illustration of the side plates.

If the activation lever 46 of the activation arrangement 11, which may also be provided with a grip, is raised to activate the unlocking unit 30, that is to say rotated in a clockwise direction in FIG. 9 about the activation pivot axis B, the tab 44' thus drives the force-transmitting element 35, that is to say the shaft 36 is rotated in a clockwise direction. Due to this rotary movement, the spline 37 drives the two lever arms 32, whereby the side plates 31 pivotably attached thereto are lowered and press the locking plates 12 downwards from the detents 21 against the lifting resilience of the locking springs 16. As soon as all teeth 18 are outside the detents 21, the lock is released and the second seat rail 8 including the vehicle seat 3 can be displaced relative to the first seat rail 5. The return spring 34, which rests against the upper edge of the stirrup region 33 between the two lever arms 32, counteracts a further rotary movement from a predefined angle of rotation of the lever arms 32 and therefore supports the action of the locking springs 16.

If the activation lever 46 is released after a longitudinal displacement of the vehicle seat 3, the lever thus returns again into its lower starting position due to the restoring force of the locking springs 16, assisted by the resilience of the return springs 34.

If the activation lever 46 of the activation arrangement 11 is pressed further downwards, either as a result of maloperation or accidentally, that is to say in an anticlockwise direction starting from FIG. 9, the overload safeguard 50 is thus active, wherein the force-transmitting element 35 remains in its position, whereas the transmission pipe 44 rotates jointly with the activation lever 46 about the axis B, such that the tab 44' moves away from the wall of the groove 39'. The misuse overload protection spring 48 is thus pushed partially from the groove 39', thus ensuring that no force, which could damage the rail locking means 10 or the unlocking unit 30, is transmitted to the force-transmitting element 35.

The force of the misuse overload protection spring 48 pushed out partially from its starting position in the groove 39' slightly counteracts the maloperation force acting on the operation lever 46 and in particular ensures, as soon as there is no longer any effective maloperation force or said force is correspondingly low, that the activation lever 46 returns to its starting position, wherein the bent end region of the misuse overload protection spring 48 on the transmission pipe side is pressed back into its starting position in the groove 39' due to the spring bias. The bent end region of the misuse overload protection spring 48 in this case acts as a wedge. This wedge effect causes the free angle between the tab 44' and the opposite wall of the groove 39' to be enlarged again, thus causing the transmission pipe 44 to rotate back about the force-transmitting element 35 until the tab 44' again rests against the other wall of the groove 39', wherein the activation lever 46 is lifted.

Although an extension of the shaft 36 transversely through the second seat rail 8 is described above, the first end region 38 of the shaft 36 may also end within the second seat rail 8. In this case, the shaft 36 can for example only be mounted by the mounting point formed on the second seat rail 8 or by one or more additional mounting points outside the second seat rail. The further embodiment, in particular the embodiment of the overload safeguard, can be implemented in the manner described above.

Furthermore, instead of a point-symmetrical spline, an asymmetrical embodiment may also be provided and has the advantage that a defined alignment of the lever arms in relation to the groove in the shaft is also possible.

LIST OF REFERENCE SIGNS 1 longitudinal adjustor
3 vehicle seat
5 first seat rail
8 second seat rail
10 rail locking means
11 activation arrangement
12 locking plate
14 guide finger
16 locking spring
18 tooth
20 slitted opening
21 detent
24 guide part
26 screw
30 unlocking unit
31 side plate
32 lever arm
33 stirrup region
34 return spring
35 force-transmitting element
36 shaft
37 spline
38 first end region
39 second end region
39' groove
40 sleeve
42 bearing
44 transmission pipe
44' tab
46 activation lever
48 misuse overload protection spring
50 overload safeguard
B activation pivot axis

The invention claimed is:

1. A longitudinal adjustor for a vehicle seat, comprising:
at least one first seat rail to be connected to a vehicle structure and at least one second seat rail to be connected to the vehicle seat, wherein the first and second seat rails engage around one another to form a rail profile and are movable relative to one another in the longitudinal direction;
a rail locking member which locks the seat rails to one another, wherein the rail locking member is arranged at least for the most part within the rail profile formed by the first and second seat rails;
an unlocking unit arranged at least for the most part within the rail profile formed by the first and second seat rails;
an activation arrangement for activating the unlocking unit; and
a force-transmitting element, which connects the activation arrangement to the unlocking unit, wherein
the force-transmitting element is inserted by one end from the side into the second seat rail, extends into the rail profile of the second seat rail or through the second seat rail, cooperates within the second seat rail with the unlocking unit, wherein a connection via a spline is provided between the force-transmitting element and unlocking unit, and the force-transmitting element, at the same time, is used for the pivotable mounting of the activation arrangement,
wherein the unlocking unit has a lever arm and at least one side plate, wherein the at least one side plate can be lowered by the lever arm such that the at least one side plate causes movement of a portion of the rail locking member to bring the rail locking member out of engagement.

2. The longitudinal adjustor as claimed in claim 1, wherein the force-transmitting element is formed at least in part by a shaft, which has an activation pivot axis extending perpendicular to the longitudinal direction of the first and second seat rails, wherein the force-transmitting element extends at least into the second seat rail.

3. The longitudinal adjustor as claimed in claim 1, wherein the lever arm is arranged completely within the rail profile and is connected to the force-transmitting element.

4. The longitudinal adjustor as claimed in claim 3, wherein the lever arm is pivotable by the force-transmitting element about an activation pivot axis running concentrically with the force-transmitting element.

5. The longitudinal adjustor as claimed in claim 1, wherein the force-transmitting element is connected purely in a positive manner via a spline to the lever arm of the unlocking unit.

6. The longitudinal adjustor as claimed in claim 5, wherein the spline is formed in a star-shape.

7. The longitudinal adjustor as claimed in claim 1, wherein the rail locking member has a guide part, which is attached to the second seat rail and has guide sleeves for guide fingers.

8. The longitudinal adjustor as claimed in claim 1, wherein the rail locking member has a guide part, which is attached to the second seat rail and is connected fixedly to locking springs, which draw locking elements into the locked position.

9. The longitudinal adjustor as claimed in claim 1, including two lever arms sitting on the force-transmitting element and interconnected at one end via a stirrup region.

10. The longitudinal adjustor as claimed in claim 1, wherein the force-transmitting element is formed by a shaft, said shaft mounting the activation arrangement concentrically with its pivot axis, wherein, in the region of the mounting point between the force-transmitting element and the activation arrangement, an overload safeguard is provided, which protects against an overload in a direction against the normal direction of activation for unlocking.

11. The longitudinal adjustor as claimed in claim 10, wherein part of the overload safeguard is an end of the force-transmitting element formed with a V-shaped groove, a transmitting pipe which has a tab protruding into the groove sitting on said end of the force-transmitting element.

12. The longitudinal adjustor as claimed in claim 11, wherein a misuse overload protection spring with an end region bent in a V-shape is further provided and extends into the groove in the normal state of use.

13. The longitudinal adjustor as claimed in claim 12, wherein, in the normal state of use, the end region bent in a V-shape rests via one side against a wall of the groove and via the other side against the tab of the transmission pipe.

14. The longitudinal adjustor as claimed in claim 12, wherein, in the event of maloperation, the tab is brought away from the wall of the groove and the end region of the misuse overload protection spring bent in a V-shape is pushed partially from the groove.

15. The longitudinal adjustor as claimed in claim 10, wherein the force-transmitting element has an activation pivot axis extending perpendicular to the longitudinal direction of the first and second seat rails, wherein the overload safeguard enables a relative rotary motion of the actuation arrangement about the activation pivot axis against the normal direction of activation, whereas the force-transmitting element does not rotate, or only rotates to an insignificant extent, about the activation pivot axis.

* * * * *